United States Patent [19]
Ducret

[11] 3,851,387
[45] Dec. 3, 1974

[54] SHIELDED CONDUIT CUTTING DEVICE
[76] Inventor: Lucien C. Ducret, 61 Marlin Dr., Norwalk, Conn. 06854
[22] Filed: May 25, 1973
[21] Appl. No.: 364,113

Related U.S. Application Data
[63] Continuation-in-part of Ser. No. 216,941, Jan. 11, 1972, abandoned.

[52] U.S. Cl.............. 30/90.3, 30/91.1, 30/91.2, 81/9.51, 83/453, 83/468, 83/924
[51] Int. Cl............................................ B21f 13/00
[58] Field of Search ......... 30/90.2, 90.3, 90.4, 90.6, 30/90.7, 90.8, 90.9, 91.1, 91.2, 92.5, 296 R, 30/296 A; 81/9.5 R, 9.5 A, 9.5 C; 83/452, 83/453, 454, 468, 924

[56] References Cited
UNITED STATES PATENTS

| | | | |
|---|---|---|---|
| 1,110,930 | 9/1914 | Harrison | 83/468 |
| 2,396,442 | 3/1946 | Shaver et al. | 81/9.51 X |
| 2,654,941 | 10/1953 | Schleimer | 30/90.3 |
| 2,674,027 | 4/1954 | Kosinski | 30/90.3 |
| 3,057,240 | 10/1962 | De Witt | 83/453 X |
| 3,453,917 | 7/1969 | Perry | 83/924 X |
| 3,633,275 | 1/1972 | Hutchinson | 30/90.3 |

FOREIGN PATENTS OR APPLICATIONS

| | | | |
|---|---|---|---|
| 35,419 | 12/1925 | Denmark | 30/296 R |
| 555,009 | 7/1943 | Great Britain | 30/91.2 |
| 1,261,360 | 4/1961 | France | 30/90.9 |

Primary Examiner—Al Lawrence Smith
Assistant Examiner—J. T. Zatarga
Attorney, Agent, or Firm—Delio and Montgomery

[57] ABSTRACT

The shielding of a shielded conduit such as BX cable is cut without the cutter head touching material below the shielding by a hand-held device comprising two elongated handle members hingeably connected, the first member carrying a radial cutter head and the second member having a shielded conduit receiving cavity therein, and wherein the wall of the cavity adjacent the first member has a slit therethrough for passage of the cutter head into cutting contact with the shield of a conduit in the cavity. The device also includes a stop member to limit the extent of passage of the cutter head through the slit, means for rotating the cutter head, and clamping means maintaining the shielded conduit in cutting contact with the cutter head when the handle members are brought together.

3 Claims, 6 Drawing Figures

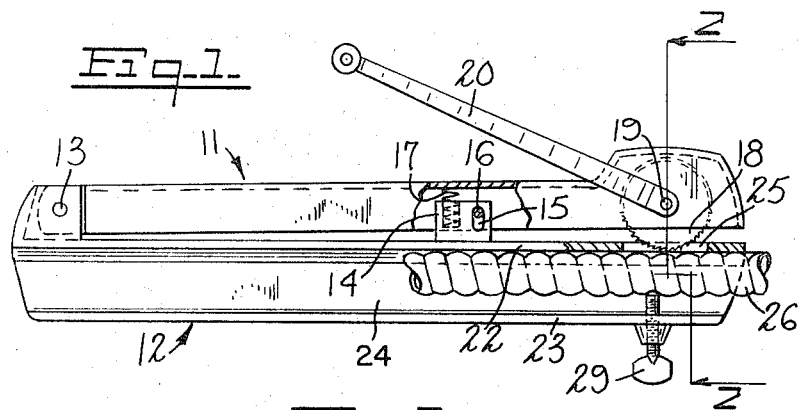
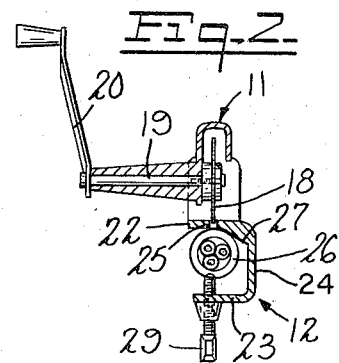
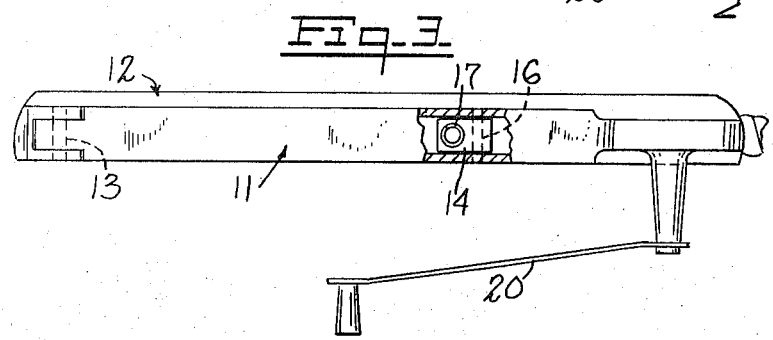
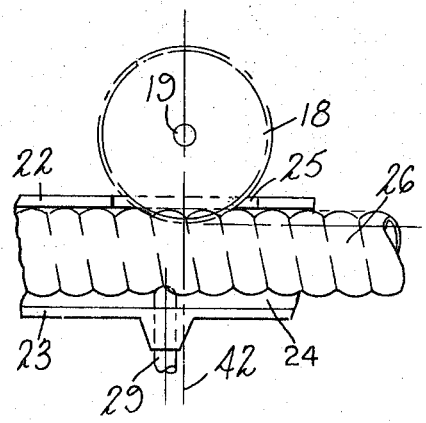
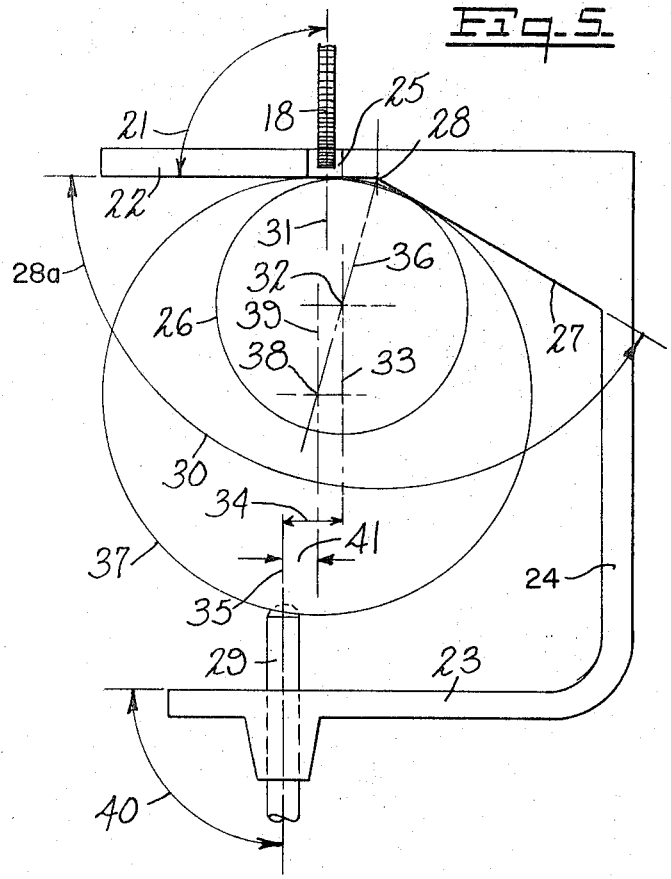
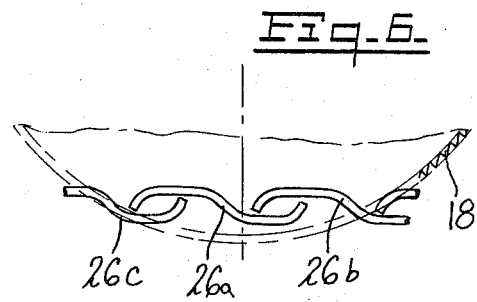

SHIELDED CONDUIT CUTTING DEVICE

BACKGROUND OF THE INVENTION

This application is a continuation-in-part of application Ser. No. 216,941 filed Jan. 11, 1972, now abandoned.

This invention relates to devices for cutting the shielding of a shielded conduit such as BX cable and the like.

Devices have been developed to replace the use of hack saws in the cutting of shielded conduits, so that the shielding can be cut without the blade touching the conduit or cable materials below the shielding. This is particularly important when it is desired to cut shielded electrical conduits such as BX cable since the shielding is metallic or of other tough material which is difficult to cut without slipping of the cutter head with consequent jagged edges and possibility of injury to an operator and material below the shield. It is important therefore to be able to maintain the cutter head in a rigid and fixed relationship to the shielding while at the same time guarding against injury either to the operator or to the conduit.

OBJECTS AND SUMMARY

Accordingly, an object of the invention is to provide a new and improved device for cutting the shielding of a shielded conduit accurately and efficiently without injury either to the material below the shielding or to the operator of the device.

Another object is to provide a new and improved device for cutting the shielding of a shielded conduit, which device can easily be held in one hand while manipulating with the other hand a means for operating the cutter head of the device.

Still another object of the invention is to provide a new and improved hand-held device for cutting the shielding of a shielded conduit, which device is adaptable to different gauge conduits such as BX cables, and wherein the conduit is held securely for accurate and efficient cutting of the shielding.

These and other objects, features and advantages of the invention will be apparent from the specification which follows.

In summary outline, the device of the invention comprises a first elongated handle member, a radial cutter head carried by the first member and arranged to cut parallel to the longitudinal axis of the first member, and a second elongated handle member hingeably connected to the first member, whereby the members are positionable longitudinally adjacent one another. The second member has a shielded conduit-receiving cavity therein, wherein the wall of the cavity adjacent the first member has a slit for passage of the cutter head into cutting contact with the shield of a shielded conduit in the cavity. The device further includes a stop member to limit the extent of passage of the cutter head through the slit, means for rotating the cutter head, and clamping means adapted to maintain the shielded conduit in cutting contact with the cutter head upon closing together of the handle members. A clamping means comprises a screw in a wall of the cavity for contact with the conduit at a point offset from both the cutting plane of the cutter head and the center of the conduit, such that the conduit can tightly wedged into the cavity in proximity to the cutting plane of the cutter head.

The invention accordingly comprises the features of construction, combination of elements, and arrangement of parts which will be exemplified in the construction hereinafter set forth, and the scope of the invention will be indicated in the claims.

DETAILED DESCRIPTION

For a fuller understanding of the nature and objects of the invention, reference is had to the following description taken in conjunction with the accompanying drawing, in which:

FIG. 1 is a partially diagrammatic longitudinal side view of a device of the invention with portions broken away to show underlying structure;

FIG. 2 is a vertical sectional view along the line 2—2 of FIG. 1;

FIG. 3 is a longitudinal top view of a device of the invention with a portion broken away to show underlying structure;

FIG. 4 is a somewhat enlarged diagrammatic detail of the structure illustrated in FIG. 1;

FIG. 5 also is a somewhat enlarged diagrammatic detail of structure illustrated in FIG. 1; and FIG. 6 is a diagrammatic enlargement upon a portion of the structure shown in FIG. 4.

With reference to FIGS. 1–6, a device of the invention includes a first elongated handle member 11 and a second elongated handle member 12 hingeably connected near their ends as by a pin 13. Each of members 11 and 12 is generally U-shaped in cross section and are hinged together such that a side wall of member 12 generally will close the opening to the cavity of member 11 when the members are brought together by hand pressure. Mounted on the exterior of a wall of member 12 is a lip-like extension 14, positioned to enter the cavity of member 11 when the members are closed together. Extension 14 has a slot 15 therein which is somewhat elongated to permit limited movement of a pin 16 therein. Pin 16 is mounted between opposing walls of member 11. A spring 17 is received in a bore in extension 14 for compression against an interior wall of member 11, so as normally to bias members 11 and 12 in opposing directions. The extension 14, slot 15 and pin 16 thus operate to limit the extent of relative movement between members 11 and 12, for a purpose to be explained.

A radial cutter head 18 is rotatably mounted on a shaft 19 between opposing walls of member 11 so as to expose only a limited portion of the cutting blade below member 11. The walls of member 11 thus protect an operator against injury from the cutter head. A crank handle 20 on shaft 19 provides for manual operation of cutter head 18 but other means for rotation could be used, such as an electric motor directly connected or gear-connected to cutter head 18. Cutter head 18 is mounted within member 11 so that the blade thereof is presented to a conduit in the cavity of member 12 at an exterior angle 21 of from about 70° to about 110° relative to the inner wall 22 of member 12. Angle 21 thereby provides an essentially radial contact of cutter head 18 with a conduit within the cavity of member 12, which cavity is defined by opposing walls 22 and 23, and bottom wall 24.

A slit 25 in wall 22 permits entry of cutter head 18 to the cavity of member 12 for contact with the shield of a conduit 26, as more clearly appears in FIGS. 2, 4 and 5. A portion 27 of the interior wall 22 of member 12 slopes on a plane inwardly of the cavity of member 12 to define an apex 28 at the junction of the plane and the remainder of wall 22. The interior angle 28a of apex 28 is about 100°–170°. With respect to FIG. 5 it will be noted that apex 28 is to the right of cutter head 18 and slit 25, and is spatially positioned relative to conduit 26 and other structure of the device in a manner and for purposes to be explained.

A thumb screw 29 is journalled through wall 23 of member 12 so that it will contact a conduit in the cavity of member 12 at a point offset from both the cutting plane 31 of cutter head 18 and the center 32 of conduit 26. Thumb screw 29 thus cooperates to provide a threepoint wedging action of a conduit into apex 28 and against wall 22 and wall portion 27 relative to cutter head 18 so that the vertical center line 33 of conduit 26 is displaced a distance 34 relative to the center line 35 of screw 29.

It will further be noted that center 32 of conduit 26 is on the line 36 which bisects the angle 30 of apex 28. In fact, the centers of any size conduit which can be received within the cavity of member 12 will be on the bisect line 36. For example, a larger conduit 37 will have its center 38 on line 36. The vertical center line 39 of conduit 37 will also, like the diagonal center line 33 of conduit 26, be substantially on or closely parallel to the cutting plane 31 of cutter head 18. However, the larger the conduit the smaller will be the displacement of its center line from the center line of thumb screw 29, as evident from the distance 41 (FIG. 5) as compared with the distance 34. Screw 29 may be set at an angle 40 of from about 40° to about 110° to the horizontal of wall 23.

Accordingly, by positioning the apex 28 such that the centers of all conduits within the cavity of member 12 will be on the bisect line 36, by locating cutter head 18 such that it is essentially aligned with (coinciding with or closely parallel to) the vertical center lines of all conduits within the cavity, and by positioning screw 29 such that it is in contact with any conduit within the cavity at a point offset from both the cutting plane 31 of the cutter head and the centers (32, 38) of any conduit within the cavity, the conduit will be tightly wedged into the cavity in the proximity to the cutting plane of the cutter head so that the shielding can be cleanly and efficiently cut without jagged edges and without injury to underlying material.

With respect to FIG. 4, it will be noted that screw 29 is mounted so that its center line 35 is slightly offset to the left of the vertical center line 42 of cutter head 18. This offset will be required when the conduit to be cut is BX cable and its extent will depend upon the circumference of cutting head 18, the size of the cavity in member 12, and the width or pitch of the convolutions of the spiral shielding of the cable often. For example, a smaller diameter BX capable will have smaller width convolutions. Consequently, the offset of screw 29 can be less. Generally, however, the offset is such that the cutter head will cover the width of about two convolutions (26a, 26b, 26c) of the shielding whereby at least one complete width of a convolution 26a, as shown in FIG. 6, will be cut. By control of these factors, the shielding of a BX capable may be cut whether a convolution 26a overlaps either convolution 26c or convolution 26b, as will be evident from FIG. 6.

Screw 29 has a tip shaped to enter the grooves between the convolutions of a BX cable although it can be adapted, if desired, for frictional contact with cables having continuous shielding.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of he invention which, as a matter of language, might be said to fall therebetween.

What is claimed is

1. A hand-held device for cutting the shielding of a shielded conduit, comprising:

a first elongated handle member;

a radial cutter head carried by said first member and arranged to cut parallel to the longitudinal axis of said member;

a second elongated handle member hingeably connected to said first member, whereby said members are positionable longitudinally adjacent one another, said second member having a shielded conduit-receiving cavity therein, the wall of said cavity adjacent said first member having a slit therethrough for passage of said cutter head into cutting contact with the shield of a shielded conduit in said cavity;

a stop member to limit the extent of passage of said cutter head through said slit;

means for rotating said cutter head; and clamping means comprising a screw in said wall of said cavity, said screw being adapted for advancement on a line generally parallel to the cutting plane of said cutter head and for contact with said conduit at a point offset from both said cutting plane and the center of said conduit, said wall having a first wall portion and a second wall portion, said first wall portion sloping on a plane inwardly of said cavity to define an apex at the junction of said first and second wall portions, said apex being positioned in proximity to said cutting plane on the opposite side thereof from said point of contact of said conduit with said screw such that the center of any conduit wedged in said cavity is generally on a line bisecting said apex, whereby said conduit can be tightly wedged into said cavity in proximity to said cutting plane and said shielded conduit is maintained in cutting contact with said cutter head upon closing together of said handle members.

2. A device as in claim 1 wherein the interior angle of said apex is about 100°–170° and the exterior angle of said cutting plane to said wall is about 70°–110°.

3. A device as in claim 1 wherein the angle between said screw and the horizontal plane of said wall is about 40°–110°.

* * * * *